United States Patent
Christofferson et al.

(10) Patent No.: US 7,506,813 B2
(45) Date of Patent: Mar. 24, 2009

(54) RESONATOR USE IN THE PRINT FIELD

(75) Inventors: David F. Christofferson, Sussex, WI (US); Edward J. Anderson, Oconomowoc, WI (US); John C. Geres, West Allis, WI (US); William T. Graushar, Elm Grove, WI (US)

(73) Assignee: Quad/Graphics, Inc., Sussex, WI (US)

( * ) Notice: Subject to any disclaimer, the term of this patent is extended or adjusted under 35 U.S.C. 154(b) by 266 days.

(21) Appl. No.: 11/316,371

(22) Filed: Dec. 22, 2005

(65) Prior Publication Data

US 2006/0196936 A1    Sep. 7, 2006

Related U.S. Application Data

(60) Provisional application No. 60/641,860, filed on Jan. 6, 2005.

(51) Int. Cl.
    G06K 19/00    (2006.01)
    G06K 19/06    (2006.01)
    G06K 7/08     (2006.01)
    G08B 13/14    (2006.01)
    H04Q 5/22     (2006.01)

(52) U.S. Cl. .................. 235/451; 235/487; 235/492; 235/493; 340/572.1; 340/10.1

(58) Field of Classification Search ............ 235/451, 235/487, 492, 493; 340/572.1, 5.6
    See application file for complete search history.

(56) References Cited

U.S. PATENT DOCUMENTS 4,058,217 A  * 11/1977 Vaughan et al. .......... 209/559
4,652,395 A  *  3/1987 Marcina et al. ......... 252/301.35
4,820,912 A  *  4/1989 Samyn ..................... 235/449
5,054,984 A    10/1991 Chan et al.
5,112,179 A     5/1992 Chan et al.
5,202,265 A     4/1993 LaMora
5,204,681 A     4/1993 Greene
5,208,630 A  *  5/1993 Goodbrand et al. .......... 399/15
5,225,900 A     7/1993 Wright
5,291,205 A     3/1994 Greene
5,301,044 A     4/1994 Wright (Continued)

FOREIGN PATENT DOCUMENTS

JP    2000222545    8/2000
JP    2002207984    7/2002

OTHER PUBLICATIONS

CROSSID, http://www.crossid.com, Jul. 12, 2005, 7 pages, CrossID.
CREO, Traceless Object Marking and Sensing Technology, http://www.creo.com/about_creo/company_overview, Nov. 24, 2004, 11 pages, Creo.

(Continued)

*Primary Examiner*—Daniel Walsh
(74) *Attorney, Agent, or Firm*—Michael Best & Friedrich LLP

(57) ABSTRACT

A plurality of resonators are embedded in a base material for use in applications in the printing industry. The base material including the resonators can be used in printing press applications, finishing applications, packaging applications, distribution applications, and downstream applications. The base material can include paper, ink, coatings, polymers, composites, adhesives, metal, or a combination of any of these materials.

8 Claims, 11 Drawing Sheets

U.S. PATENT DOCUMENTS

| | | | |
|---|---|---|---|
| 5,486,022 A * | 1/1996 | Crane | 283/83 |
| 5,581,257 A | 12/1996 | Green et al. | |
| 5,802,015 A | 9/1998 | Rothschild et al. | |
| 5,891,240 A | 4/1999 | Greene | |
| 5,973,598 A | 10/1999 | Beigel | |
| 5,983,065 A | 11/1999 | Folkins et al. | |
| 6,040,773 A | 3/2000 | Vega et al. | |
| 6,100,804 A | 8/2000 | Brady et al. | |
| 6,147,662 A | 11/2000 | Grabau et al. | |
| 6,164,551 A | 12/2000 | Altwasser | |
| 6,165,609 A | 12/2000 | Curatolo | |
| 6,246,326 B1 | 6/2001 | Wiklof et al. | |
| 6,262,692 B1 | 7/2001 | Babb | |
| 6,265,977 B1 | 7/2001 | Vega et al. | |
| 6,410,112 B1 | 6/2002 | Hatfield | |
| 6,429,831 B2 | 8/2002 | Babb | |
| 6,471,878 B1 | 10/2002 | Greene et al. | |
| 6,486,780 B1 | 11/2002 | Garber et al. | |
| 6,520,544 B1 | 2/2003 | Mitchell et al. | |
| 6,593,853 B1 | 7/2003 | Barrett et al. | |
| 6,600,420 B2 | 7/2003 | Goff et al. | |
| 6,708,881 B2 * | 3/2004 | Hartmann | 235/454 |
| 6,819,244 B2 * | 11/2004 | Dukler et al. | 340/572.1 |
| 6,857,714 B2 * | 2/2005 | Hohberger et al. | 347/2 |
| 6,922,146 B2 * | 7/2005 | Yogev et al. | 340/568.2 |
| 6,958,696 B2 * | 10/2005 | Hartmann et al. | 340/572.1 |
| 6,966,493 B2 * | 11/2005 | Hartmann | 235/454 |
| 6,997,388 B2 * | 2/2006 | Yogev et al. | 235/492 |
| 7,128,482 B2 * | 10/2006 | Meyerhofer et al. | 400/124.08 |
| 7,180,304 B2 * | 2/2007 | Grishin et al. | 324/637 |
| 7,295,120 B2 * | 11/2007 | Waldner et al. | 340/572.7 |
| 2001/0013830 A1 | 8/2001 | Garber et al. | |
| 2002/0033570 A1 | 3/2002 | Crowley | |
| 2002/0116274 A1 * | 8/2002 | Hind et al. | 705/23 |
| 2002/0135481 A1 | 9/2002 | Conwell et al. | |
| 2002/0138355 A1 | 9/2002 | Briggs et al. | |
| 2002/0167500 A1 | 11/2002 | Gelbman | |
| 2002/0189750 A1 | 12/2002 | Bleckmann et al. | |
| 2002/0196126 A1 * | 12/2002 | Eisenberg et al. | 340/10.2 |
| 2002/0196146 A1 | 12/2002 | Moore | |
| 2003/0006878 A1 | 1/2003 | Chung | |
| 2003/0029540 A1 | 2/2003 | Stromberg | |
| 2003/0061947 A1 * | 4/2003 | Hohberger et al. | 101/2 |
| 2003/0062131 A1 | 4/2003 | Hohberger et al. | |
| 2003/0063001 A1 | 4/2003 | Hohberger et al. | |
| 2003/0063139 A1 | 4/2003 | Hohberger et al. | |
| 2003/0067381 A1 | 4/2003 | Mitchell et al. | |
| 2003/0076520 A1 | 4/2003 | Haines et al. | |
| 2003/0111540 A1 * | 6/2003 | Hartmann | 235/492 |
| 2003/0127525 A1 | 7/2003 | Stromberg | |
| 2003/0133003 A1 | 7/2003 | Nedblake, Jr. et al. | |
| 2003/0136503 A1 | 7/2003 | Green et al. | |
| 2003/0141366 A1 * | 7/2003 | Hartmann | 235/451 |
| 2003/0151028 A1 | 8/2003 | Lawrence et al. | |
| 2003/0169149 A1 | 9/2003 | Ohki et al. | |
| 2003/0206107 A1 * | 11/2003 | Goff et al. | 340/572.7 |
| 2003/0210313 A1 | 11/2003 | Nedblake, Jr. et al. | |
| 2003/0214387 A1 | 11/2003 | Giaccherini | |
| 2003/0214388 A1 | 11/2003 | Stuart et al. | |
| 2003/0218072 A1 | 11/2003 | Hanhikorpi | |
| 2003/0227528 A1 | 12/2003 | Hohberger et al. | |
| 2004/0001000 A1 | 1/2004 | Redlin | |
| 2004/0004295 A1 | 1/2004 | Stromberg et al. | |
| 2004/0026690 A1 * | 2/2004 | Bernds et al. | 257/40 |
| 2004/0033833 A1 * | 2/2004 | Briggs et al. | 463/42 |
| 2004/0061324 A1 * | 4/2004 | Howard | 283/69 |
| 2004/0085192 A1 * | 5/2004 | Hartmann | 340/10.4 |
| 2004/0118929 A1 * | 6/2004 | Edmonson et al. | 235/492 |
| 2004/0169444 A1 * | 9/2004 | Higuchi et al. | 310/348 |
| 2004/0174257 A1 * | 9/2004 | Kuhns et al. | 340/508 |
| 2004/0204240 A1 * | 10/2004 | Barney | 463/36 |
| 2004/0211840 A1 * | 10/2004 | Yogev et al. | 235/491 |
| 2004/0263335 A1 * | 12/2004 | Molnar | 340/572.1 |
| 2005/0007238 A1 * | 1/2005 | Hartmann et al. | 340/10.2 |
| 2005/0045723 A1 * | 3/2005 | Tsirline et al. | 235/451 |
| 2005/0114270 A1 * | 5/2005 | Hind et al. | 705/64 |
| 2005/0154368 A1 * | 7/2005 | Lim et al. | 604/403 |
| 2005/0174236 A1 * | 8/2005 | Brookner | 340/539.26 |
| 2005/0218215 A1 * | 10/2005 | Lauden | 235/380 |
| 2005/0230966 A1 * | 10/2005 | Trantoul et al. | 283/117 |
| 2005/0250211 A1 * | 11/2005 | Reinhardt et al. | 436/43 |
| 2005/0259930 A1 * | 11/2005 | Elkins et al. | 385/100 |
| 2005/0264423 A1 * | 12/2005 | Hartmann | 340/572.8 |
| 2005/0280504 A1 * | 12/2005 | Pettus | 340/10.1 |
| 2006/0022043 A1 * | 2/2006 | Smets et al. | 235/451 |
| 2006/0076402 A1 * | 4/2006 | Lerch et al. | 235/380 |
| 2006/0180647 A1 * | 8/2006 | Hansen | 235/375 |
| 2006/0192992 A1 * | 8/2006 | Sekiya et al. | 358/1.15 |
| 2006/0196936 A1 * | 9/2006 | Christofferson et al. | 235/385 |
| 2006/0224128 A1 * | 10/2006 | Lurvey et al. | 604/250 |
| 2007/0046433 A1 * | 3/2007 | Mukherjee | 340/10.1 |
| 2008/0030344 A1 * | 2/2008 | Weller et al. | 340/572.8 |
| 2008/0084276 A1 * | 4/2008 | Bauchot et al. | 340/10.1 |
| 2008/0164690 A1 * | 7/2008 | Heierli et al. | 283/87 |
| 2008/0191878 A1 * | 8/2008 | Abraham | 340/572.1 |
| 2008/0250954 A1 * | 10/2008 | Depta et al. | 101/170 |

OTHER PUBLICATIONS

Sean Milmo, Potential is Tremendous for RFID and Smart Labels, Ink World, Nov. 2003, 3 pages, Ink World Magazine.

CREO Inc. and XINK Laboratories, file://C:\Documents%20 and%20Settings\xpsetup\Local%20Settings\Temporary%20 Internet%20F. . ., Jun. 21, 2005, 2 pages, Creo Inc. and Xink Laboratories.

Rensselaer Polytechnic Institute, Chipless RFID Identification Technology, conference brochure from http://www/rpi.edu/~herages/CL-RFID_Conf.html, May 3, 2004, 8 pages, Rensselaer Polytechnic Institute, Troy, New York.

INKODE, Radio Frequency Technologies & System Solutions, http://www.inkode.com, Apr. 15, 2004, 25 pages, Inkode.

Daniel Lopresti and George Nagy, Chipless ID for Paper Documents, Technical Report LU-CSE-05-010, Jan. 2005, 11 pages, Lehigh University Department Of Computer Science and Engineering Bethlehem, Pennsylvania.

Rensselaer National Science Foundation, http://www.rpi.edu/cl-rfid/ , Conference Report International Conference on Chipless Identification Technologies, Magnetic-Optical-RF and others, Dec. 19, 2005, 11 pages, Rensselaer National Science Foundation, Troy, New York.

* cited by examiner

RESONATOR USE IN THE PRINT FIELD

RELATED APPLICATIONS

This application is a non-provisional application of and claims priority to U.S. Provisional Patent Application Ser. No. 60/641,860 filed on Jan. 6, 2005. The entire contents of Provisional Patent Application Ser. No. 60/641,860 are hereby incorporated by reference

BACKGROUND

In the printing industry, keeping track of individual paper, bound books such as magazines and catalogs, bundles, pallets, and packages is difficult, time consuming and expensive. Optical bar code systems have been utilized in the printing industry; however, this technology operates at short range and requires line of sight detection. Magnetic systems also have been utilized in the printing industry; however, this technology requires contact with magnetic media and a prescribed orientation of the magnetic material. Active RF tag technology is bulky requiring a battery or antenna to power the device and a chip for intelligence and data storage, both assembled together and encased in a material such as plastic. The size and expense of these active RF tags limit their use.

SUMMARY OF THE INVENTION

One embodiment of the invention includes a method for processing a printed product. The method includes the acts of providing a printed product having embedded therein a chipless passive resonator, energizing the resonator, reading a signal emitted from the resonator, processing the signal to generate a unique identifier for the printed product, and associating the unique identifier with information relating to the printed product.

Another embodiment of the invention includes a method for processing a printed product. The method includes the acts of providing a printed product having associated therewith a passive microscopic resonator, energizing the resonator, reading a signal emitted from the resonator, processing the signal to generate a unique identifier for the printed product, and using the unique identifier to access information relating to the printed product.

Another embodiment of the invention includes a method of associating a printed product with a database of information relating to the printed product. The method includes the acts of producing a printed product having embedded therein a passive chipless resonator, creating a database of information relating to the printed product, energizing the resonator, sensing a signal emitted by the resonator, processing the signal to generate a unique identifier for the printed product, and correlating the unique identifier with information in the database relating to the printed product.

A further embodiment of the invention includes a printed product system. The printed product system includes a printed product having embedded therein a chipless passive resonator energizable to emit a signal, a unique identifier for the printed product derived from the emitted signal, and a database of information relating to the printed product and accessible using the unique identifier.

DETAILED DESCRIPTION OF THE INVENTION

Figure 1:
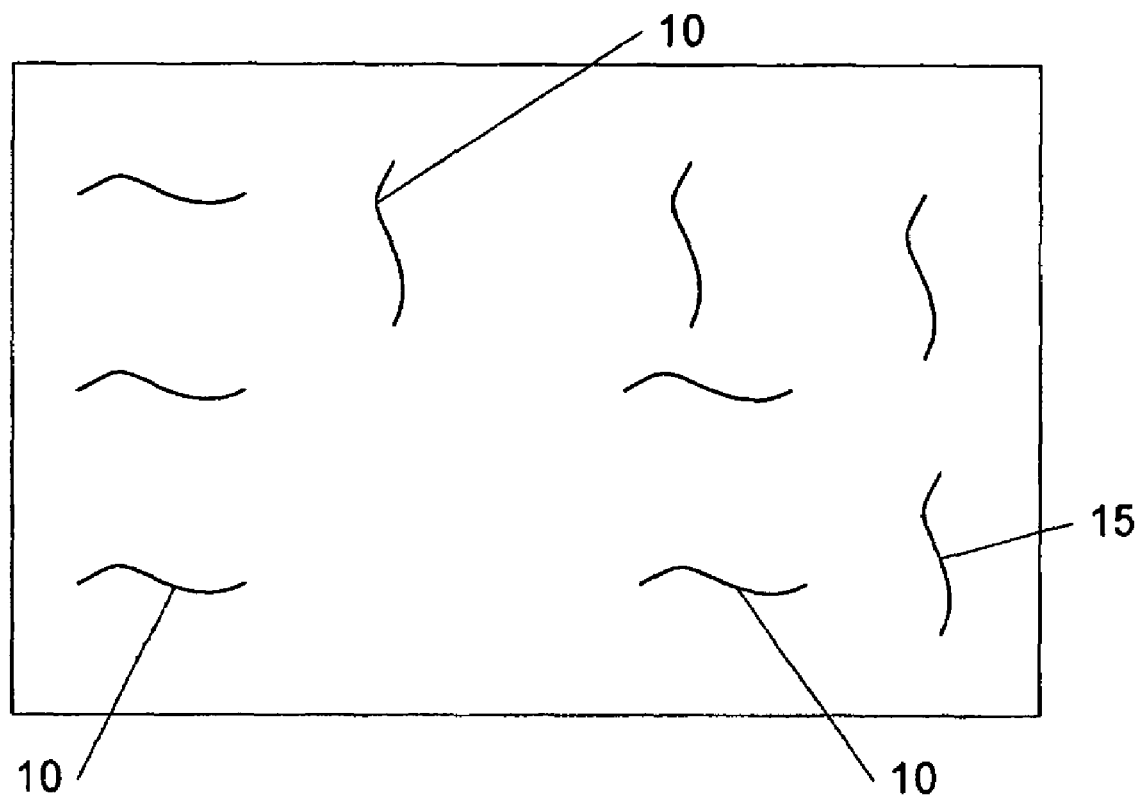
FIG. 1 illustrates a representation of a base material with resonators embedded therein.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limited. The use of "including," "comprising," "supporting," or "having" and variations thereof herein is meant to encompass the items listed thereafter and equivalents thereof as well as additional items. The terms "mounted," "connected," "supported," and "coupled" are used broadly and encompass both direct and indirect mounting, connecting, supporting, and coupling. Further, "connected" and "coupled" are not restricted to physical or mechanical connections or couplings, and can include electrical connections or couplings, whether direct or indirect.

In addition, it should be understood that embodiments of the invention include both hardware and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software. As such, it should be noted that a plurality of hardware and software based devices, as well as a plurality of different structural components may be utilized to implement the invention. Furthermore, and as described in subsequent paragraphs, the specific mechanical configurations illustrated in the drawings are intended to exemplify embodiments of the invention and that other alternative mechanical configurations are possible.

With reference to FIG. 1, the invention includes a plurality of resonators 10 embedded in a base material 15 for use in applications in the printing industry. For example, the base material 15 including the resonators 10 can be used in printing press applications, finishing applications, packaging applications, distribution applications, and downstream applications. Examples of these applications and the use of the base material 15 including the resonators 10 will be described below. However, it should be noted that one of skill in this art may find other applications or processes for using the invention in the printing industry and the invention is capable of other embodiments and of being practiced in other ways not specifically set forth herein.

The base material 15 can include paper, ink, coatings, polymers, composites, adhesives, metal, or a combination of any of these materials, for example. The resonators 10 can be microscopic structures, such as fibers, filaments, or inert powders that are odorless, colorless, generally invisible to the unaided eye and that are chemically undetectable. Suitable resonators are available from Inkode of Vienna, Va. as Taggents and from Creo, Inc. of Canada as Traceless Taggants. The resonators from Creo Inc. are available in standard, exotic and custom formulations depending upon the application, with the custom taggants creatable to fit a specific customer need.

The resonators 10 are mixed or combined with the contents or ingredients of the base material 15. The amount of resonators 10 to be added to the contents of the base material 15 is controlled and depends upon the contents or type of base material 15 and the application in which the base material 10 including the resonators 15 are to be used. For example, resonators from Creo, Inc. are mixed with the base material at a level of less than 2 ppm to ensure invisibility. The resonators are geometrically randomly distributed within the base material and, therefore, are not positioned in the same place twice. The resonators are safely disposable, can be effective for over 100 years, and can eliminate the real estate needed on a product for codes.

Figure 2:
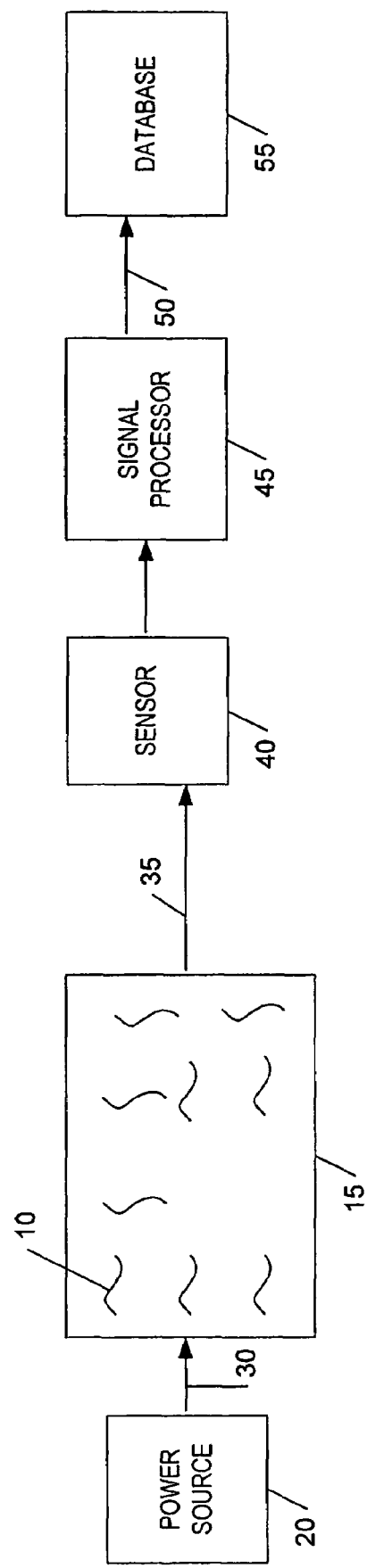
FIG. 2 illustrates a schematic of a resonator energizing process.

The resonators 10 are passive in that they do not require any power source such as a battery or an antenna. As shown in FIG. 2, the resonators 10 are energized by a power source 20. The power source 20 can include a signal generator such as, a radio frequency signal generator (e.g., low power RF signal), a microwave signal generator, or other generators known in the art. The power source 20 can direct a power signal 30 toward the base material 15. Preferably, an area of the base material 15 is isolated such as by reference to a location (i.e., edge or corner) or reference to a mark (i.e., geometric shape, logo, image, or text). The resonators 10 within the base material 15, at the isolated area, respond to the power signal 30 with a response signal 35.

A sensor 40 reads or decodes the response signal 35. The response signal 35 is representative of the arrangement of the resonators 10 within the base material 15 and is unique to the particular arrangement. As an example, the volume, length, and/or placement of the resonators 10 in any base material 15 and the size of the base material 15 can affect the response signal 35 of the resonators 10 when energized by the power source 20.

A signal processor 45 receives the response signal 35 (with or without some processing having been performed by the sensor 40) from the sensor 40 and can process, analyze, and/or digitize the response signal 35 to generate a unique identification 50.

The power source 20, the sensor 40, and the processor 45 can be supported by a single housing such as in a hand held reader. It is noted that the power source 20, the sensor 40, and/or the processor 45 can also be supported in separate housings. The power source 20, sensor 40 and processor 45 can be positionally fixed, mobile, or imbedded in another piece of equipment, can move with respect to other equipment and/or processes occurring within a printing process, or can be combined into one or more elements.

A reader is available from Inkode and Creo, Inc. The Creo, Inc. reader can isolate an area to read and has read rates of 100 reads/second. The Creo, Inc. reader can sense or detect the response signal from a distance, such as ten feet or greater, with no line of sight requirements. The Inkode reader has a data capture of approximately two microseconds per bit at six inches.

Figure 3:
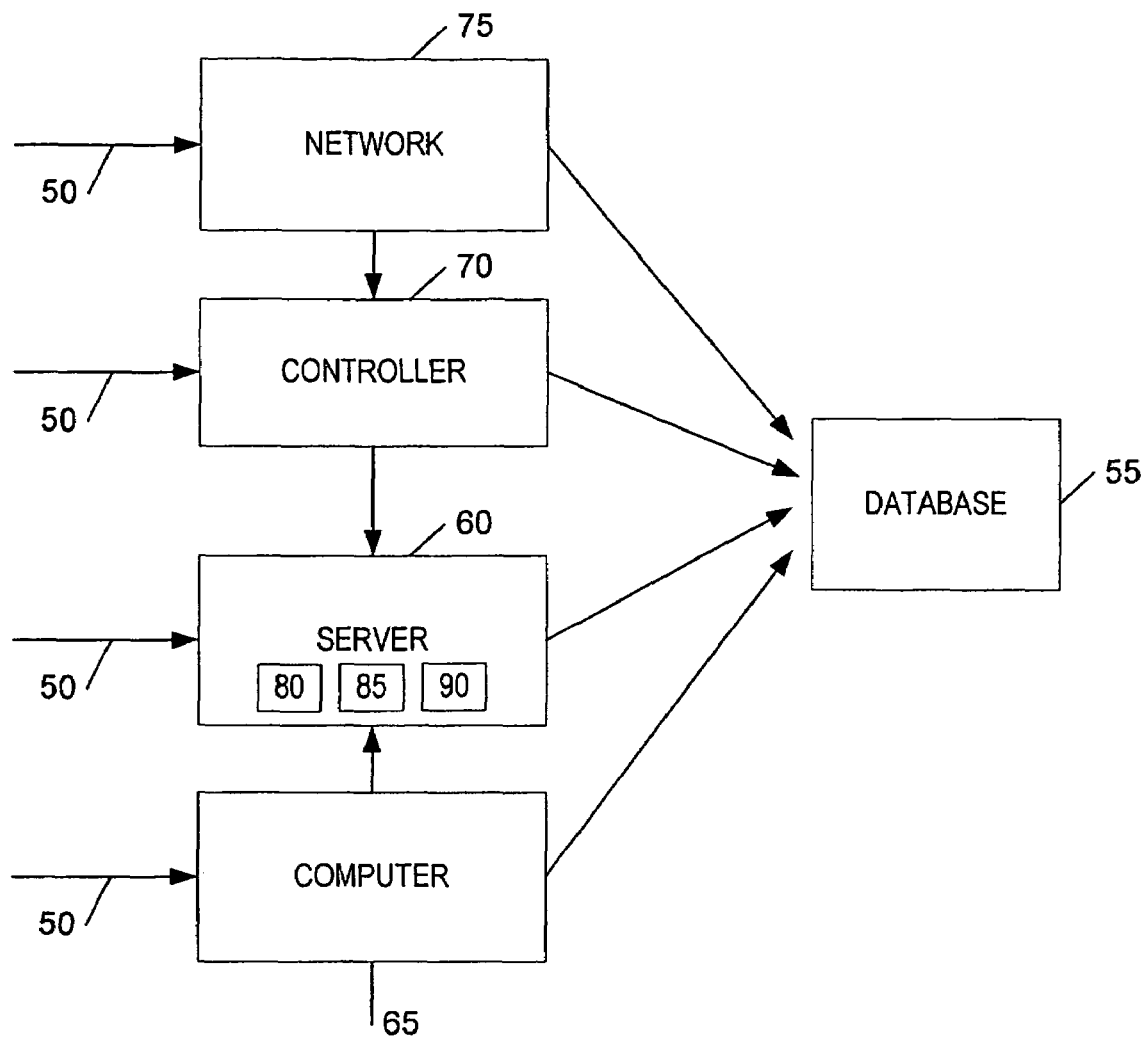
FIG. 3 illustrates a schematic of communication links.

As illustrated in FIG. 2, the identification 50 is correlated to information stored in a database 55. With specific reference to FIG. 3, the identification 50 is transmitted to the database 55 via a server 60 and/or to any other system or location, such as a computer terminal 65, a controller 70, and/or network 75. The server 60 can include an operating system 80 for running various software programs 85 and/or communications applications 90. The software programs 85 can be manipulated by computer terminals 65 and/or the controller 70 to acquire, enter, review, and/or save information.

The network 75 can be built according to any networking technology or topology or combinations of technologies and topologies and can include multiple sub-networks. Connections between the systems shown in FIG. 3 can be made through local area networks ("LANs"), wide area networks ("WANs"), public switched telephone networks ("PSTNs"), Intranets, the Internet, or any other suitable networks.

The controller 70 can generate instructions, based on the identification 50, for any type of printing equipment, such as printing presses, mailing lines, binding lines, hoppers, feeders, in-line printers, card feeders, equipment for sorting, stacking or cartoning, etc. and can communicate the instructions to the printing equipment.

The unique identification 50 can be stored in the database 55 for future comparisons along with storage of additional data associated with the unique identification 50. Such additional data can include information regarding the base material 15 or other material to which the base material 15 is attached, such as, for example, type of material, tracking number, item identification, identification of information printed on the base material 15, recipient information, publisher information, time and dates, manufacturer of the base material 15, employee information, demographics information, or any other information needed for a particular application.

A suitable database 55 is available from Creo, Inc. as the Infinity™ authentication database. When the resonators 10 are embedded in a random configuration in the base material 15, the odds of obtaining a duplicate configuration which generates the same unique identification 50 is extremely remote. The database 55 can be integrated with other software or databases as needed in a particular application.

Figure 4:
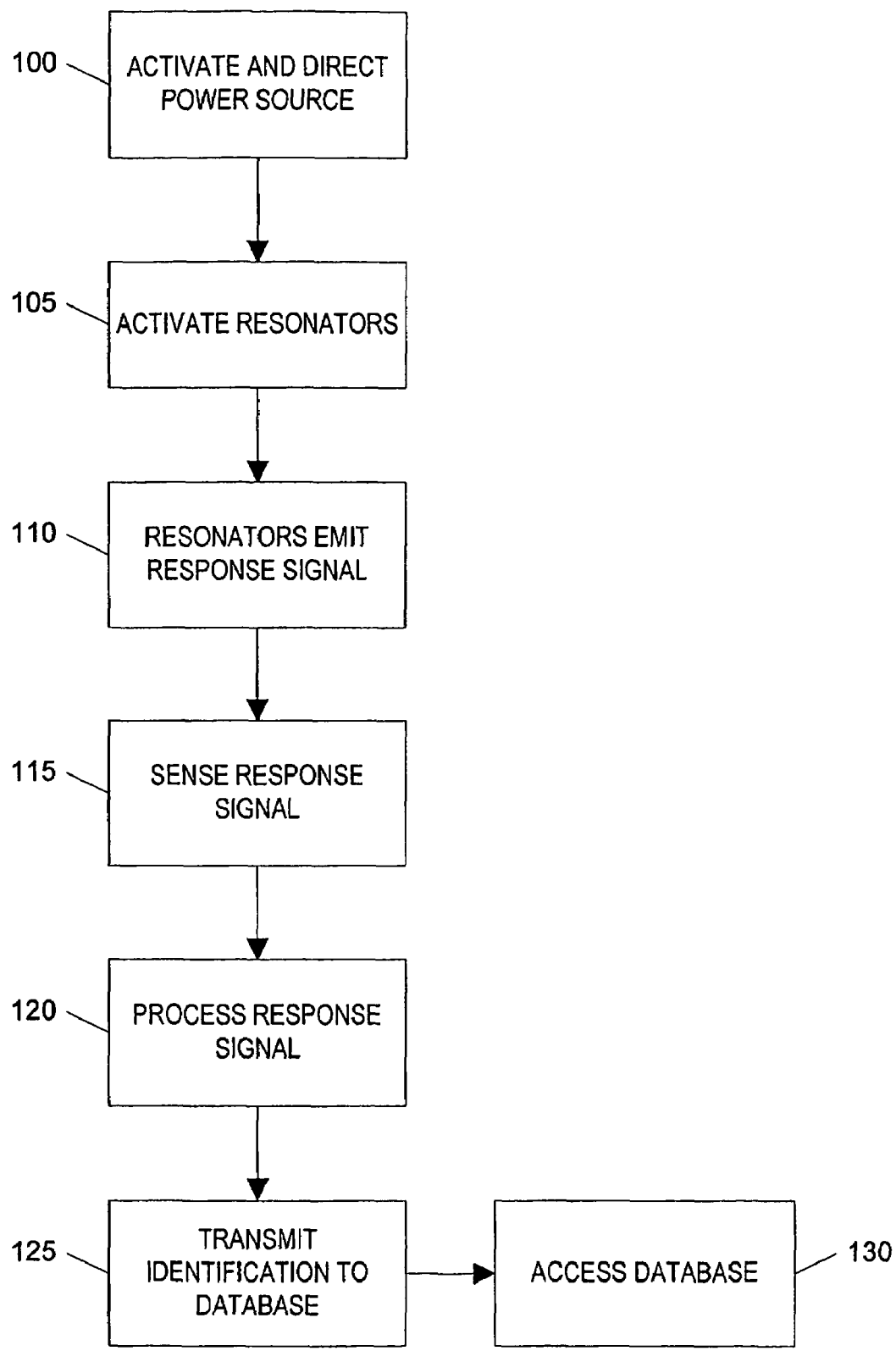
FIG. 4 is a flowchart of a method of operation of the invention according to one embodiment.

FIG. 4 illustrates a flow chart of an embodiment of a method of the present invention. A user activates and directs (at 100) the power source 20 toward the base material 15. The power signal 30 activates (at 105) the resonators 10 within the base material 15. The resonators 10 emit (at 110) the response signal 35. The sensor 40 (at 115) senses the response signal 35. The response signal 35 is processed (at 120) to obtain the unique identification 50. The unique identification 50 is sent to the database 55 directly or indirectly (at 125). The database 55 is then accessed as needed (at 130).

As indicated above, the resonators 10 can be embedded in almost any base material 15. For use in the printing industry, the base material 15 can include, for example, paper, ink, coatings, polymers, composites, adhesives or metal, as are discussed below.

Paper

Figure 5:
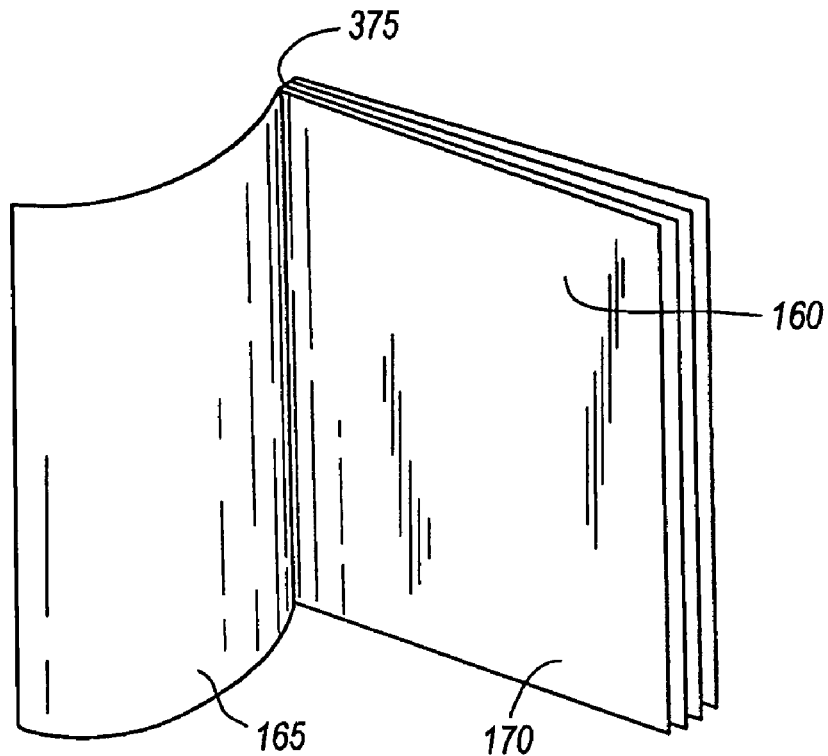
FIG. 5 illustrates a representation of paper having resonators embedded therein.

The resonators 10 can be embedded into paper 160, such as the signature 170 shown in FIG. 5, when the paper is being manufactured from pulp. Paper as used herein includes all virgin and recycled materials, all natural and synthetic materials, and like substrates for printing upon. The paper 160, regardless of the content or form (e.g., labels, tags, packaging, wrapping, envelope, cover, shipping carton, signature, etc.) can be tracked throughout the printing, bindery, mailing and distribution processes based on the identification 50 generated by the resonators 10 in the paper 160. The paper 160 can be printed upon by a printing press or printer in web or sheet format. The paper 160 can be incorporated into a printed product 165 such as a magazine, catalog, direct mail piece, advertising, and the like. The paper 160 can be used as a signature 170 in the printed product 165, as shown in FIG. 5, or as an insert, an onsert, a check, a coupon, an invoice, a cover, a cover wrap, and the like.

Figure 6:
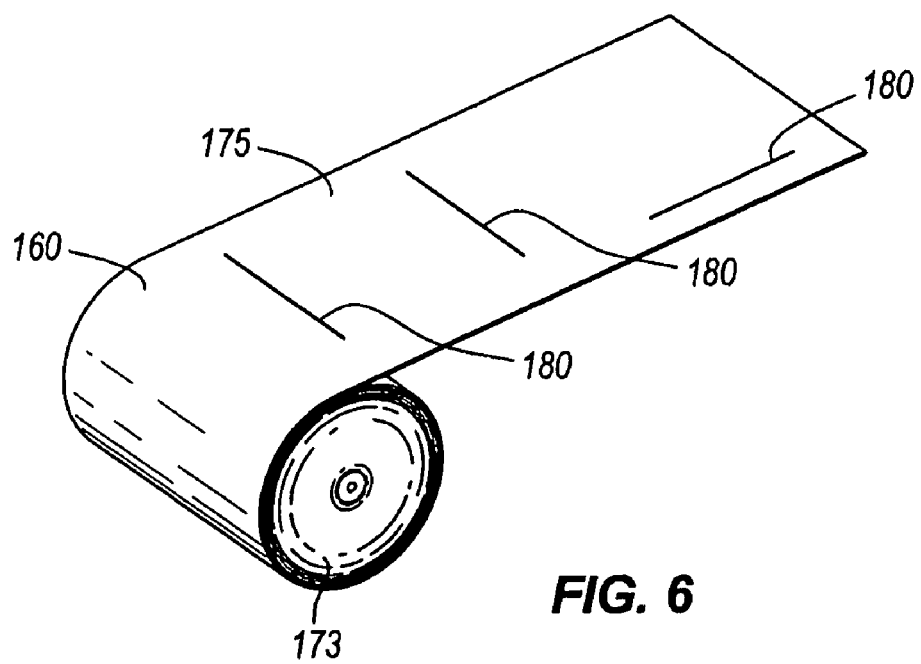
FIG. 6 is a perspective view of a roll of paper.

During manufacture of the paper 160, the paper manufacturer can mix the resonators 10 into each batch of the pulp. Each batch of pulp will have a unique number, ratio, and arrangement of resonators 10. The pulp is transformed into a web 175 of paper 160 and is usually formed on large rolls for printing operations. The paper 160 can be any size whether on rolls, precut sheets, precut strips, etc. As shown in FIG. 6, if the paper 160 is being formed onto large rolls, the paper manufacturer can energize and read the signal reflected by the web 175 at various strategic locations 180 throughout the web 175 to obtain the identification 50 of the paper 160 at those various locations 180. The locations 180 can be anywhere on the web 175, such as near an edge of the web 175, in the middle of the web 175, or anywhere in between the edges of the web 175. The locations 180 can be marked such that they are visible to the human eye.

At each of the locations 180, the paper manufacturer can energize and read the signal reflected by the web 175 to obtain the identification 50 of the location 180. The identification 50 can be transmitted and stored in the database 55. The identification 50 of each location 180 can be associated with additional information, such as, the name of the manufacturer of the paper 160, the type of paper 160, the time and day the paper 160 was manufactured, who mixed the batch of pulp, when and by who the paper 160 will be shipped, where the paper 160 is going to be stored, etc. The additional information associated with the identification 50 can be requested by the manufacturer that ordered the paper 160. The identification 50 and associated information can be stored in the database 55, which can be shared between manufacturers and/or downloaded onto portable media that can be shipped with the paper 160. Each of the identifications 50 does not need to include all of the additional information mentioned above. Each identification 50 does not require additional information, and each identification 50 can be associated with as much or as little additional information as desired. Additional information, not mentioned here, can be included and associated with the identification 50.

Figure 7:
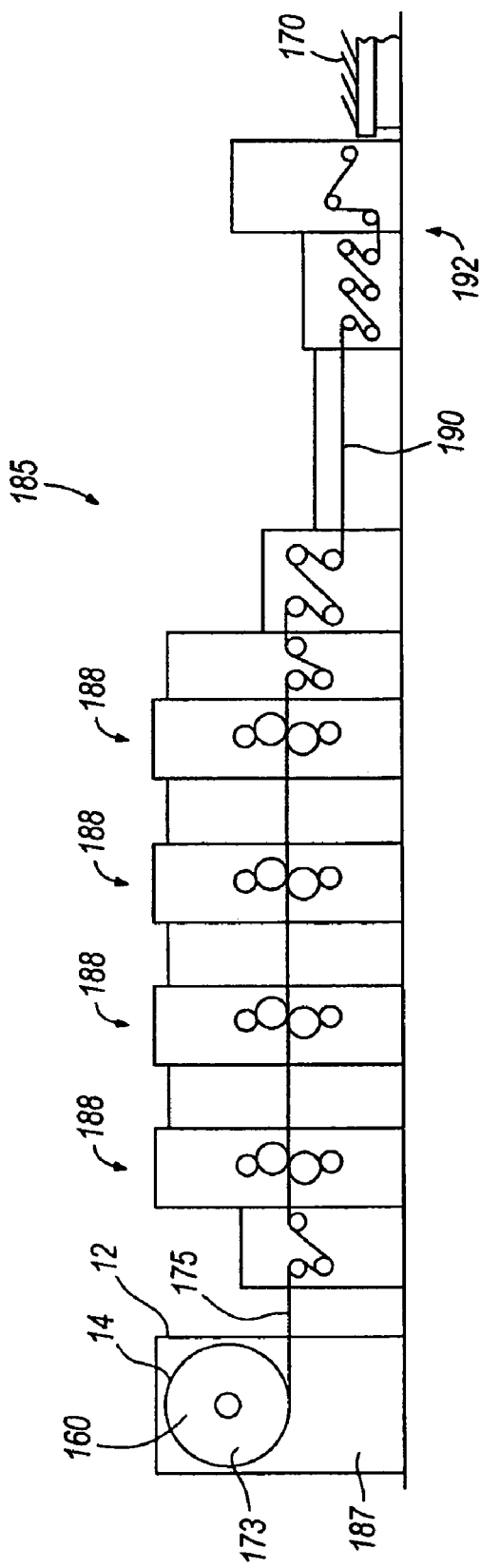
FIG. 7 is a side elevational view of a web offset printing press.

With reference to FIG. 7, the paper 160 is transported to the printing facility where the roll 173 is typically stored until it is needed. When the roll 173 is ready for use, the manufacturer can energize and read the reflected signal 35 from one of the locations 180 to obtain the identification 50 to verify that the correct roll 173 is being obtained from storage. The roll is transported to a printing press 185. A typical printing press 185, as illustrated in FIG. 7, can include a reel stand 187 that feeds the web 175 to one or more printing units 188 that imprint the web 175 with images to form a printed web 190. The printed web 190 is typically driven through a number of processing units such as a dryer unit, a chill stand, and a coating machine. The printed web 190 is then typically fed to a folder, 192 to be slit, folded, and cut into the signatures 170.

As a result of being cut and folded, each signature 170 can have a unique identification 50. The locations 180 can correspond to each signature 170 if properly oriented and identified during the paper manufacturing process. In this situation, the manufacturer can continue to use the locations 180 and the associated identifications 50 to continue to track the signatures 170 as they are further processed. Alternatively, the manufacturer can identify new locations on each of the signatures 170 and can energize and read the new locations with the power source 20 to obtain the identification 50 of each of the signatures 170. The identification 50 of the new locations can be transmitted and stored in the database 55. In either situation, the manufacturer can include additional information that can be associated with each of identifications 50 for each signature 170. Additional information can include, for example, the type of signature 170, a description of the text, advertisements or images on the signature 170, the printing equipment used to generate the signature 170, employee information that operated the equipment used to generate the signature 170, the date and time the signature 170 was generated, the storage location, the title of the printed product 165 in which the signature 170 is to be used, and various other types of information.

Figure 8:
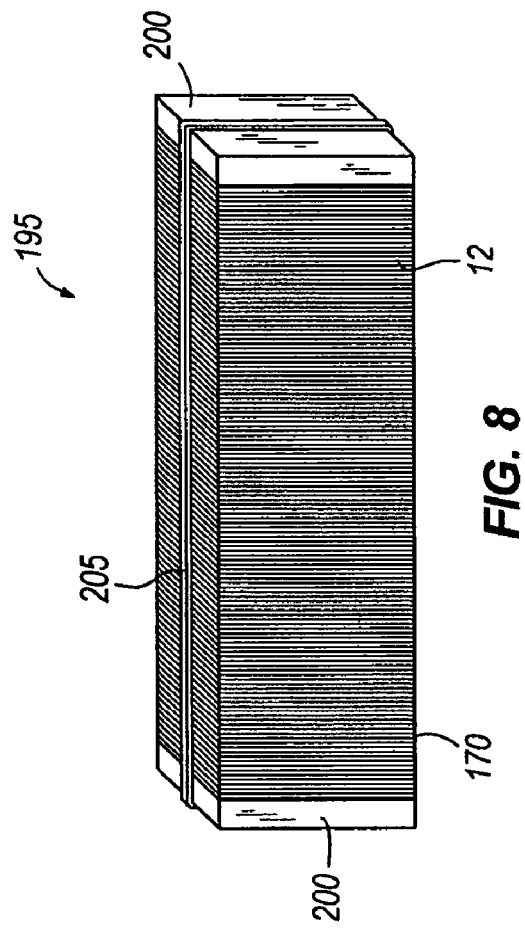
FIG. 8 is a perspective view of a signature log.

As shown in FIG. 8, the signatures 170 are typically stored as a log 195 with an end board 200 on each end to support the signatures 170. The end boards 200 and signatures 170 are secured together with straps 205 to form the log 195. The log 195 could also be constrained within a container. As will be described below, the straps 205, end boards 200 and/or container can include resonators 10. The manufacturer can energize and read a particular location 180 on the straps 205, end boards 200 and/or containers to obtain the identification 50. The identification 50 can be stored in the database 55 and additional information can be associated with the identification 50. For example, the additional information can include the contents of the log 195, the quantity of signatures 170 in the log 195, the titles of the printed products 165 in which the signatures 170 will be used, storage location of the log 195, the date and time the log 195 was generated, employee information, the date and time the log 195 is to be used, recipient information, orientation information, and the like.

Figure 9:
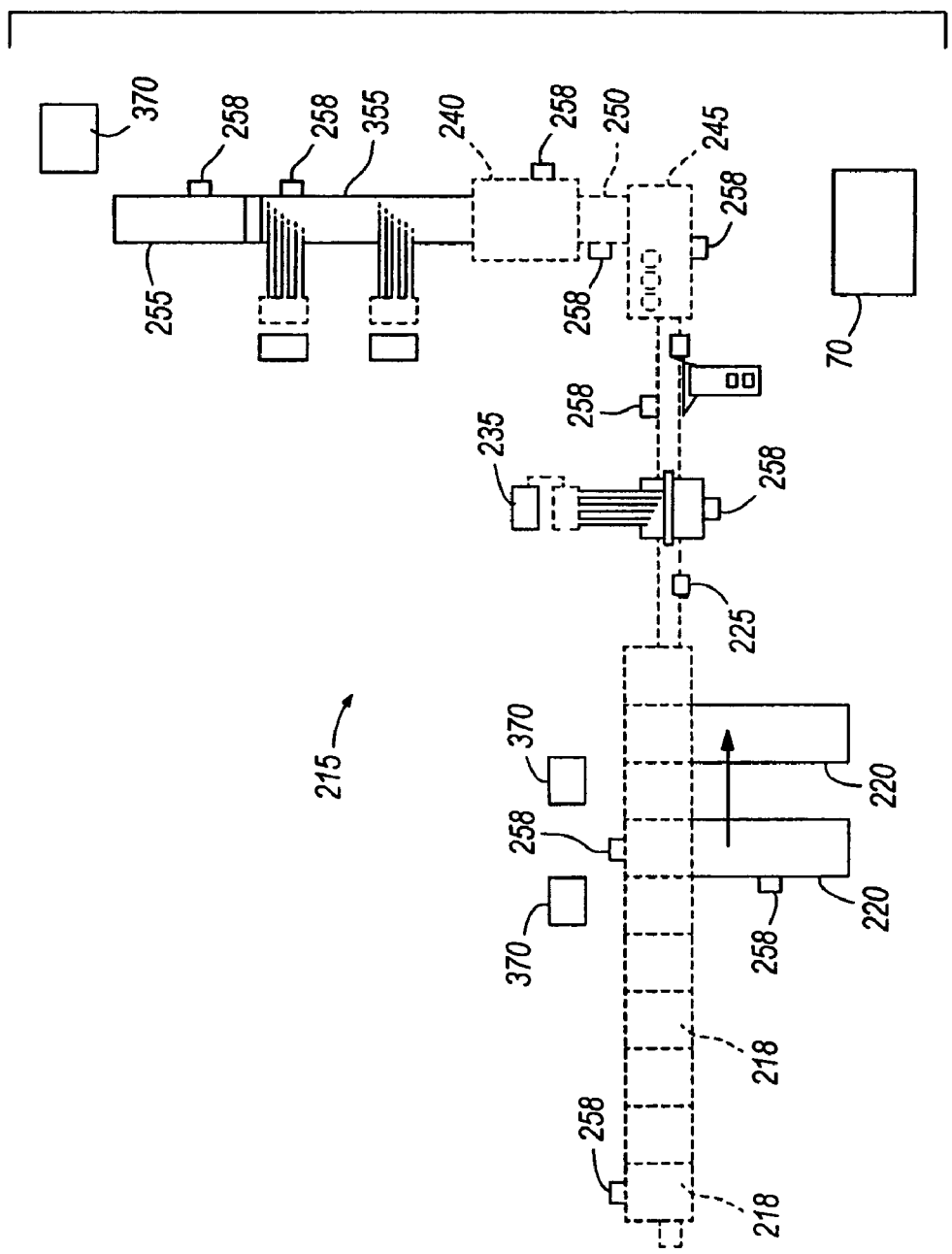
FIG. 9 is a plan view of a finishing line.

When the log 195 is ready for use, the manufacturer can energize and read the reflected signal at one of the locations 180 on the straps 205, end boards and/or container 200 to obtain the identification 50 to verify that the correct log 195 is being obtained from storage. The log 195 is transported to a finishing line where the signatures 170 are further processed with additional printing equipment to generate the printed products 165. Generally, these processes can be referred to as finishing processes and the equipment can be referred to as finishing lines. FIG. 9 illustrates one finishing line such as a binding line 215.

The binding line 215 includes a plurality of pockets 218 and feeders 220 and a conveyor line 225. The pockets 218 and feeders 220 hold the signatures 170 that are fed onto the conveyor line 225 to comprise the printed products 165. Although only a limited number of pockets 218 and feeders 220 are illustrated, it should be understood that the binding line 215 can include additional or fewer pockets 218 and/or feeders 220. In addition, any conventional feeders 220 can be used as part of the binding line 215 without departing from the scope of the present invention.

The binding line 215 can include a print station 235, an inspection station 240, a stitcher 245, a trimming station 250, and a stacker 255 as are known in the art. The additional feeders positioned downstream of the feeders 220 can feed additional signatures 170 and/or selective items, such as, order forms, postcards, special-interest publications, CD-ROMs, DVDs, electronic or digital media, subscription cards, promotional offers, coupons, etc. The print station 235 can include a non-contact printer such as an ink jet and/or a laser printer that prints personalized indicia, i.e., recipient name and address, on the cover or on an interior page of the printed product 165. The inspection station 240 inspects each printed product 165 for appropriate thickness or print quality by a caliper, camera or other sensor. This information is transmitted to the controller 70, which compares the measured thickness or print quality with a reference thickness or print quality in order to determine if the book has been appropriately assembled. If an error was made in the assembly of the printed product 165, the printed product 165 can be rejected from the binding line 215.

The stitcher 245 binds each printed product 165. The trimming station 250 trims the edges of each printed product 165. The stacker 255 bundles together the printed products 165 that are being delivered to a destination such as a common zip code, or other predetermined order, for easy handling by the U.S. Postal Service. Other stations or operations may be included in the binding line 215 that are known in the art.

The binding line 215 can include a plurality of power sources 20 and sensors 40 housed in a reader 258 that is positioned adjacent to each feeder 220 and/or positioned throughout various locations on the binding line 215. The power sources 20 can be oriented to energize and the sensors 40 oriented to read particular locations 180 on the signatures 170. The power sources 20 and sensors 40 can also be supported on translation devices, which can move to search for and/or automatically identify a particular location 180 on the signature 170.

The readers 258 can be connected to the controller 70, directly or via additional devices. A suitable controller 70 is the FCS 2000 available from QuadTech, Inc. in Sussex, Wis. The controller 70 can connect to the feeders 20 to control the delivery of the signatures 170 to the conveyor line 225.

When the binding line 215 is in use, the manufacturer can energize and read the signal reflected by one of the locations 180 on the straps 205 and/or end boards 200 of the log 195 to obtain the identification 50 to verify that the correct log 195 is being placed within the correct feeder 220 and is properly oriented in the feeder 220. Various configurations of the binding line 215 can be used, usually depending on the title, a type of signatures, and contents of the printed product 165. The configuration of the binding line 215 can also depend on the quantity of titles being bound at the same time. It is noted that there are a limitless number of methods in which embodiments of the present invention can be used with the finishing lines and processes. A few examples of how the binding line 215 can operate using embodiments of the methods of the present invention are described herein; however, embodiments of the methods of the present invention are not limited to the examples described.

Figure 10:
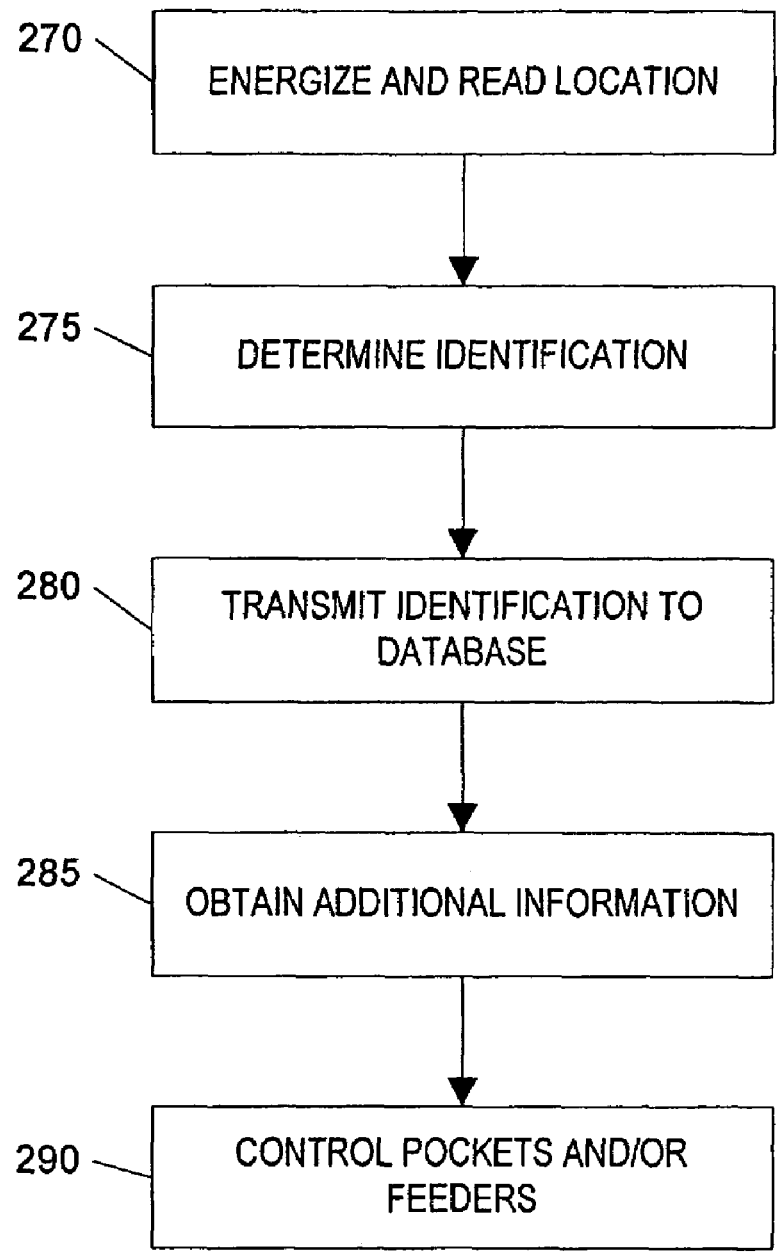
FIG. 10 is a flowchart of one method of the present invention.

For an example related to a driver piece, a reader 258 can be positioned adjacent to at least one of the pockets 258 or feeders 220. FIG. 10 illustrates a flow chart of an embodiment of the method of the invention. The reader 258 can energize and read (at 270) a particular location 180 on the signature 170 about to be delivered to the conveyor line 225 to generate the identification 50 (at 275). The identification 50 is transmitted (at 280) to the database 55 and/or controller 70 to obtain (at 285) the additional information associated with the identification 50. Based on the additional information, the controller 70 can command (at 290) the pockets 218 and feeders 220 to build the printed product 165 as it moves downstream on the conveyor line 225. The additional information can include, for example, recipient information, which can identify the particular signatures 170 that are to make-up the recipient's printed product 165, thus generating a customized printed product 165 for the recipient. The controller 70 is aware of all the signatures 170 loaded in the pockets 218 and feeders 220 during a binding operation. The recipient's printed product 165 can be customized based on the recipient's location, job title, preferences, likes and dislikes, and the like. For example, one title of a magazine generally includes different information and advertising based on demographics of the recipient.

Figure 11:
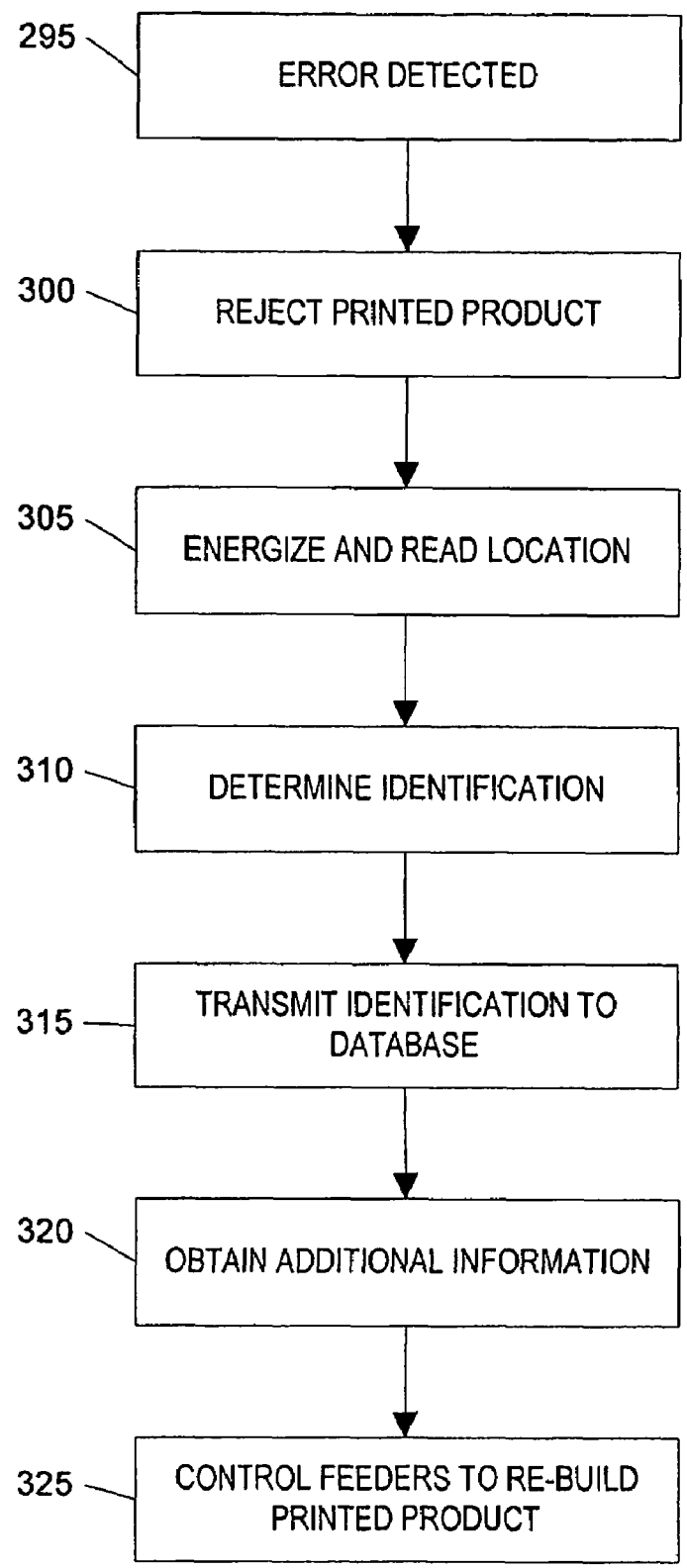
FIG. 11 is a flowchart of one method of the present invention.

As another example relating to a recall piece and with reference to FIG. 11, the reader 258 can be positioned adjacent to any one of the print station 235, the inspection station 240, the stitcher 245, and the trimming station 250. After all of the signatures 170 have been fed to the conveyor line 225 to form a printed product 165, additional processes are performed on the signatures 170 to bind and/or secure together the signatures 170. Occasionally, an error occurs in the finishing process, e.g., misfeed from one or more of the pockets 218 and feeders 220, and can be detected at any location along the conveyor line 225. For example, a misfeed from one or more of the feeders 220 can be detected at the inspection station 240. FIG. 11 illustrates a flow chart of an embodiment of the method of the invention. If an error in the printed product 165 is detected (at 295), the printed product 165 can be rejected (at 300) at various locations along the conveyor line 225. The reader 258 can energize and read (at 310) a particular location on the printed product 165 to generate the identification 50. The identification 50 is transmitted (at 315) to the database 55 and/or controller 70 to obtain (at 320) the additional information associated with the identification 50. Based on the additional information, the controller 70 can control (at 325) the pockets 218 and/or feeders 220 to re-build the printed product 165. The additional information can also identify which log, bundle, pallet or container the rebuilt printed product 165 needs to be placed into.

As another example relating to an individual signature, occasionally, a signature 170 can fall out of a printed product 165. The manufacturer can use this method to energize and read a particular location on the signature 170 to obtain the identification 50. Based on the identification 50, the manufacturer can identify and locate the printed product 165 in which the signature 170 belonged and can mark the printed product 165 "bad". A replacement printed product 165 can be printed for the particular recipient of the printed product 165 as described above.

As another example relating to a card blower, a reader 258 can be positioned adjacent to a card blower. As each card or other item is blown into the printed products 165, the reader 258 can read each card or item to obtain the identification 50 of each card or item. It is noted that the identification 50 of each card or item was previously obtained and stored in the database 55 as described above. Based on the identification 50, the manufacturer can identify and verify the type and quantity of cards or items being inserted into each printed product.

As another example relating to reusing signatures, the signatures 170 of the rejected printed products 165 can be sorted and reused. The manufacturer can use this method to read the location 180 on each signature 170 to obtain the identification 50. Based on the identification 50, the manufacturer can identify what printed product 165 in which the signature 170 is associated and the pockets 218 and/or feeder 220 that fed the signature 170. The manufacturer can reposition the signatures 170 in the appropriate feeders 200 to be reused.

In addition, selected cards or items can be inserted into particular printed products 165 based on demographics data. The identification 50 of each card or item is stored in the database 55 as described above. Additional information can be associated with each identification 50, such as, for example, contents of the card, whether it is personalized, demographics data, and the like. As each of the printed products 165 pass a reader 258, they are energized and read to obtain the identification 50 and its associated information to verify if the card or item should be inserted into that printed product 165. The recipients of the printed product 165 can receive specialized and/or personalized additional information based on demographics, preferences, likes and dislikes, and the like.

The resonators 10 in the paper 160 can be used to monitor quality control issues. The web 175 of paper 160 includes different identifications 50 based on where the paper is energized. The manufacturer of the paper 160 can use this method at various locations 180 throughout the length and width of the paper 160 to obtain the identifications 50 at each location 180 (e.g., every 50 meters, 100 meters, etc.). The manufacturer of the paper 160 can store the identification 50 information for each location 180 in a database 55. If a break occurs in the web 175, during a printing process, the manufacturer can determine the location of the break by reading one of the locations 180 on the paper 160 near the break with the power source 20 to obtain the identification 50 at the location 180. Based on the identification 50, the manufacturer of the paper 160 can determine the longitudinal and lateral location on the web 175, where the break occurred and any other information that may have been stored in the database 55 and is associated with the particular identification 50. The manufacturer of the paper 160 can monitor manufacturing processes, can determine root cause, and can improve quality control issues.

Also, during the printing process, the manufacturer can use this method at various locations 180 on the web 175 to obtain identifications 50. Based on the identifications 50, the manufacturer can include additional information to be associated with the identification 50 in the database 55. For example, the manufacturer can include which printing press 185 the web 175 was printed on, the day and time the web 175 was printed, and the operator of the printing press 185, and the like.

After the printing process, the printed web 190 is cut into a plurality of ribbons. If a problem occurs in one of the ribbons during a downstream printing process, the manufacturer can use this method to energize and read one of the locations 180 on a ribbon. Based on the identification 50 of the particular location 180 on the ribbon, the manufacturer can determine how the ribbon exited the printing press 185 and can backtrack to determine how and/or why the downstream problem occurred. This information obtained from the identification 50 can help identify problems that could never have been previously identified. The corrective actions that can be made provide savings in money and time for the manufacturer.

The manufacturer can also track when and how recycled paper 335 is used. The manufacturer of recycled paper 335 can include the resonators 10 in the pulp used to make the recycled paper. As the paper is being formed into a web 175 or sheet, the manufacturer can use this method to obtain identifications 50 of the paper at various locations 180. The locations 180 can be anywhere on the web 175, such as near an edge of the web 175, in the middle of the web 175, or anywhere in between the edges of the web 175. The locations 180 can be marked such that they are visible to the human eye.

At each of the locations 180, the paper manufacturer can obtain the identification 50 of the locations 180. The identification 50 can be transmitted and stored in the database 55.

The identification 50 of each location 180 can be associated with additional information, such as, the name of the manufacturer of the paper 160, the type of paper 160, the time and day the paper 160 was manufactured, the employee(s) that mixed the batch of pulp, when and by who the paper 160 will be shipped, where the paper 160 is going to be stored, and the like. The additional information associated with the identification 50 can be requested by the manufacturer that ordered the paper 160. The identification 50 and associated information can be stored in the database 55, which can be shared between manufacturers and printers (via network) and/or downloaded onto portable media that can be shipped with the paper 160. Each of the identifications 50 does not need to include all of the additional information mentioned above. Each identification 50 does not require additional information, and each identification 50 can be associated with as much or as little additional information as desired. Of course, additional information, not mentioned here, can be included and associated with the identification 50.

This information allows the manufacturer to identify when and where, throughout the printing process, recycled paper is used. The manufacturer can identify recycled paper with an embedded environmental label and can track the amount of recycled paper used in various processes and can promote environmental friendliness with the use of recycled paper.

Typically, manufacturers have to print extra signatures 170 to accommodate downstream problems, such as rejects, misfeeds, and the like. The extra signatures 170 can be used to replace the rejects and misfeeds. With the resonators 10 included in the paper 160 used to make the signatures 170, the manufacturer can determine how many rejects and misfeeds occur in each downstream printing process by accurately identifying the particular signatures 170 and/or printed products 165 that get rejected or misfed in each downstream process. The manufacturer can more accurately predict the correct number of extra signatures 170 and/or printed products 165 at the printing press 185 based on the number of rejects or misfeeds previously experienced and accurately counted using this method. By more accurately predicting the number of extra signatures 170 and/or printed products 165, the manufacturer can avoid waste due to over printing.

Generally, this method allows the manufacturer to count signatures more accurately, including counts of both used, unused, or rejected signatures for example.

Ink and Coatings

Figure 12:
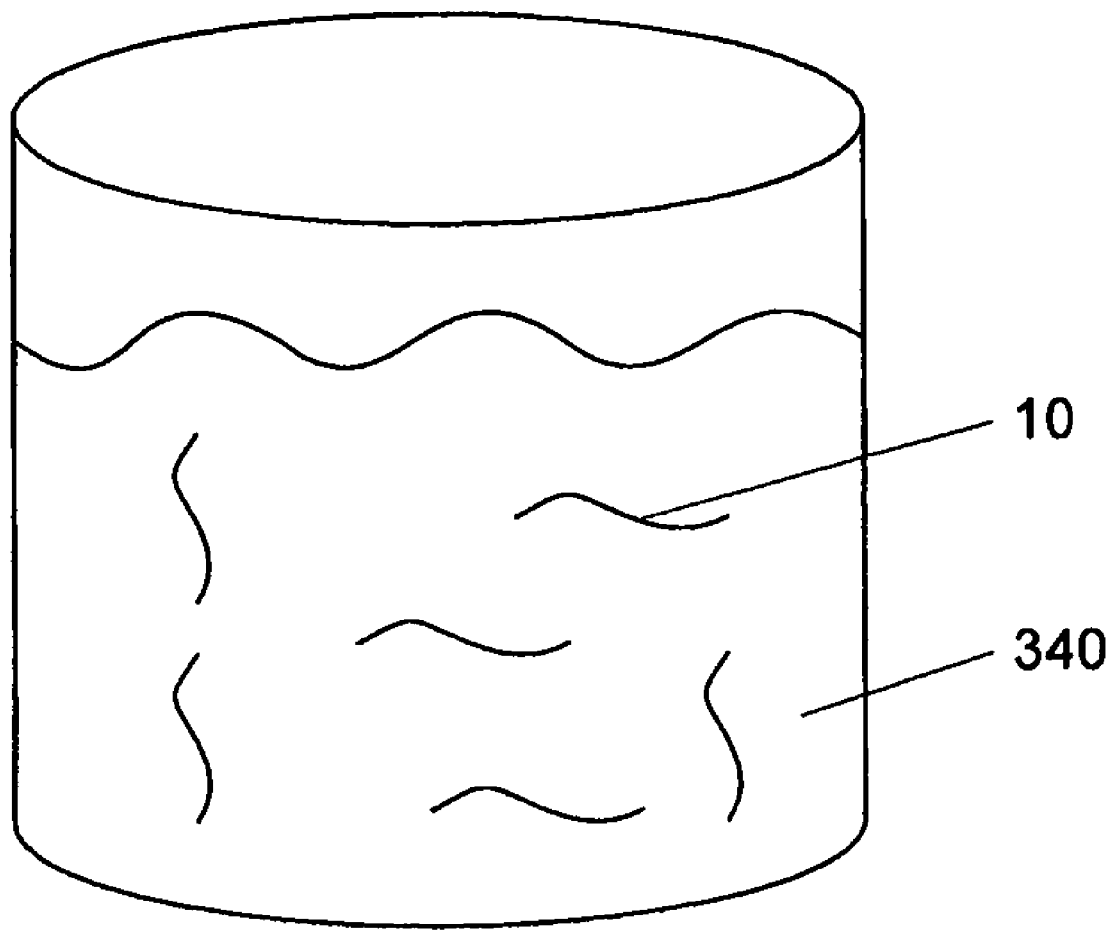
FIG. 12 illustrates a representation ink with resonators embedded therein.

As shown in FIG. 12 the resonators 10 can be embedded into ink 340 that is thereafter applied to a substrate such as paper, plastic, metal, or any other material. The ink 340 can be in liquid or powder form. The ink 340 can be used to print all or part of a printed product 165, can be used to print on the paper 160 as indicated above, can be used to print a label or tag on the printed products 165, and/or can be used to print on the packaging or wrapping of a printed product 165. The resonators 10 can be also embedded into a powder or a liquid coating to be applied to a substrate 345 such as silicons or varnishes.

The resonators 10 are mixed into batches of ink 340. The print manufacturer can apply a desired amount of the ink 340 onto a substrate, such as the container holding the ink 340 and/or a label on the container, and use this method to obtain the identification 50 of the ink 340 on the substrate and store the identification 50 in the database 55. Additional information can be associated with the identification 50 and stored in the database 55. Additional information can include date and time the ink 340 was mixed and/or manufactured, color, type of ink 340, where the ink 340 is going to be stored, the employee(s) that mixed the batch of ink 340, when and by whom the ink 340 will be shipped, and the like. The additional information associated with the identification 50 can be requested by the manufacturer that ordered the ink 340. The identification 50 and associated information can be stored in the database 55 that can be shared between manufacturers and/or downloaded onto portable media that can be shipped with the ink 340.

When the ink 340 is ready for use, the print manufacturer can energize and read the ink 340 on the container to obtain the identification 50 to verify that the correct ink 340 is being obtained from storage. The ink 340 is transported to the printing press 185.

For example, after the ink 340 is applied to the web 175 of paper 160 by the printing press 185 or at any other suitable time/location during the printing operation, this method can be used at locations 180 on the printed image to obtain the identification 50 at each location 180. The identification 50 for each location 180 can be stored in the database 55. Additional information can be associated with the identification 50, such as date and time the image was printed, the printing press 185 used to print the image, the lateral and longitudinal position (e.g., from an encoder) of the location 180 with respect to the dimensions of the web 175, etc.

The print manufacturer monitors the quality of the ink color after the printing press 185 has printed the desired images onto the web 175. If the print manufacturer detects a change in the quality of the ink color and/or images printed on the web 190, the manufacturer can determine which batch of ink 340 from which the ink 340 originated. The manufacturer can use this method to obtain the identification 50 of the location 180 where quality of the ink 340 changed. Based on the identification 50 of the ink 340, the manufacturer can determine where in the printing process the quality of the color changed and what particular ink color and/or batch of ink may have changed.

If the recipient of a printed product 165, e.g., a magazine, is unhappy (e.g., inferior quality of construction) with the printed product 165, the manufacturer can use this method to obtain one or more identifications 50 to determine the day and time that the particular printed product 165 was manufactured and which printing press 185 and other downstream processes handled the particular printed product 165.

Polymers

Figure 13:
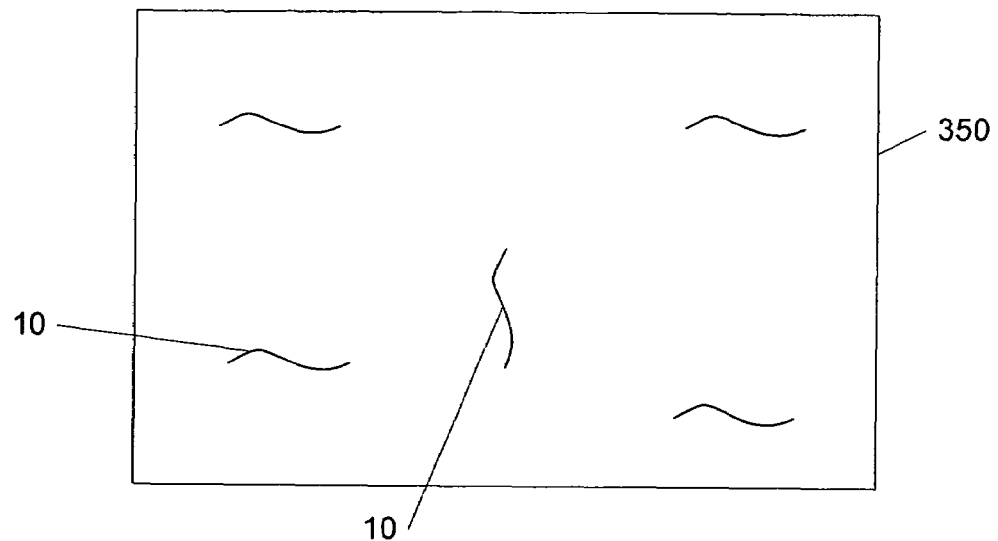
FIG. 13 illustrates a representation of a polymer with resonators embedded therein.

As shown in FIG. 13, the resonators 10 can be embedded into a polymer 350 such as plastic. The polymer 350 can be rigid and/or flexible. The polymer 350 can be incorporated into printed products 165, can be used as a packaging material or wrapping (e.g., shrink wrap or poly wrap) around printed products 165, can be used as a fastener such as a strap (205 in FIG. 8), or can be used as a container for printed products 165. The polymer 350 can be printed upon.

The finishing line 215 can include a wrapping station 355 as illustrated in FIG. 9. Selected printed products 165 in a stream of a plurality of printed products 165 can be wrapped. Sometimes it is desirable to wrap the selected printed products 165 with, for example, paper or conventional band wrapping or plastic film which may be a polymeric or polyethylene plastic film (collectively referred to as a "wrap"). There are many reasons for selectively wrapping printed products 165. For example, it may be desirable to offer certain recipients various features or selected advertising based upon their special interests, income or occupation. Likewise, it may be relevant to customize products or services contingent upon a recipient's previous buying history. For example, a publication may issue one demo edition for parents of newborn children who have previously purchased baby products, another edition for farmers interested in the latest agricultural equipment and still another edition for recent purchasers of exercise equipment. In each situation, a publisher may utilize various modes of customization such as blown-in card feeding, invoicing, advertising material insertion, renewal notices and tipping, as well as several types of contact or contactless printing. As a result, it is usually desirable to wrap the products including one or more of these items in order to enclose such loose items.

It is also sometimes desirable to preserve the appearance of the printed products 165. Customizing certain printed products 165 with additional material or protecting certain printed products 165 from damage requires that these products be wrapped with a protective wrapping. The wrapping station 355 can apply a transparent polywrap material or paper wrap material or band wrap material around each individual printed product 165.

The resonators 10 are mixed into batches of the polymer 350. A reader 258 can be positioned adjacent to and/or downstream of the wrapping station 355. After the printed product 165 has been wrapped, the reader 258 can energize and sense a particular location 180 on the wrap 360 to obtain the identification 50. The identification 50 can be stored in the database 55. Additional information can be associated with the identification 50, such as date and time the printed product 165 was wrapped, the finishing line(s) 215 used to assemble the printed product 165, the recipient of the printed product 165, demographics of the recipient, the contents of the printed product 165, etc.

As mentioned above with respect to FIG. 8, plastic straps 205 that hold a log 195 together (with or without an end board 200) can include the resonators 10. The manufacturer can use this method to read a particular location 180 on the strap(s) 205 to obtain the identification 50. The identification 50 can be stored in the database 55 and additional information can be associated with the identification 50. For example, the additional information can include the contents of the log 195, the destination of the log 195, recipient information for each of the printed products 165 within the log 195, inventory information, postage costs, identification of transportation, and the like.

Composites

The resonators 10 can be embedded into composite materials 365 such as a wood composite material that can be used for end boards 200 (FIG. 8) and pallets 370 (FIG. 9), for example. The resonators 10 can also be embedded into composite materials 365 used as shipping containers, bins, and the like. The composite material 365 can be comprised of various metals or various plastics.

The number of end boards 200 and pallets 370 can be accurately accounted for within the printing facility. As mentioned above, the manufacturer can use this method to read a particular location 180 on the end boards 200 to obtain the identification 50. The identification 50 can be stored in the database 55 and additional information can be associated with the identification 50. For example, the additional information can include the contents of the log 195, the quantity of signatures 170 in the log 195, the titles of the printed products 165 in which the signatures 170 will be used, storage location of the log 195, the date and time the log 195 was generated, employee information, the date and time the log 195 is to be used, recipient information, orientation information, and the like.

The pallets 370 can hold signatures 170, printed products 165, or virtually anything within the printing facility. The manufacturer can energize a read a particular location 180 on the pallet 370 to obtain the identification 50 for that location 180. The identification 50 can be stored in the database 55 and additional information can be associated with the identification 50. Additional information can include the contents of the pallet 370, the quantity of items on the pallet 370, the titles of the items on the pallet 370, storage location of the pallet 370, the date and time the items on the pallet 370 are to be used, recipient information, orientation information, shipping and destination information, postage costs, and the like.

The manufacturer can combine various titles of printed products 165 and different classes of printed products 165 on one pallet 370. This can be referred to as co-palletization. Because of the use of the resonators 10, the manufacturer can have an updated inventory and itemization of every printed product 165 on the pallet 370. As a result, the manufacturer can provide an accurate count of each type of printed product 165 that is on the pallet 370 to obtain greater postal discounts. The manufacturer can track the postal discounts and can allow the postal service to verify the discount. In addition, because the manufacturer is able to provide an accurate amount for postage, the postal service may provide credits and/or additional discounts.

The shipping dock at the manufacturer can use this method to read the location 180 on pallets 370, straps 205, and/or end boards 200 to obtain the identification 50. Based on the information associated with the identification 50 in the database, the shipping personnel can determine the particular truck (carrier, shipper, etc.) which to load the pallet 370 and/or printed products 165.

Adhesives

With reference to FIG. 5, the resonators 10 can be embedded into adhesives 375 such as glues that are used to assemble and/or bind printed products 165. The binding line 215 can include a glue station where glue is applied to the spine of the printed product 165 to secure all of the pages together. A reader 258 can be positioned adjacent to and/or downstream of the glue station. After the glue has been applied to the printed product 165, the manufacturer can use this method to read a location 180 in the glue to obtain the identification 50. The identification 50 can be stored in the database 55. Additional information can be associated with the identification 50 and stored in the database 55. Additional information can include, for example, recipient information, contents of the printed product 165, date and time the printed product 165 was generated, shipping information, postage costs, and the like.

Metal

Figure 14:
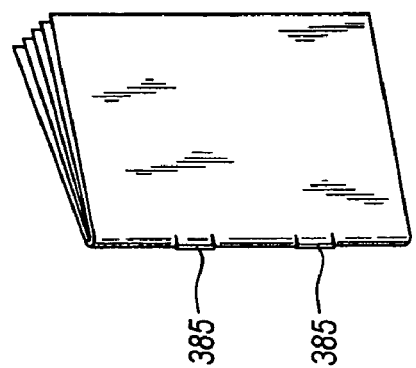
FIG. 14 illustrates a bound book.

With reference to FIG. 14, the resonators 10 can be embedded into metals 385 such as fasteners, staples, containers and the like that can be used to assemble and/or bind the printed products 165. The binding line 215 can include a fastener station where staples are applied to the spine of the printed product 165 to secure all of the pages together. A reader 258 can be positioned adjacent to and/or downstream of the fastener station. After the staples have been applied to the printed product 165, the manufacturer can use the reader 258 to energize and read a location 180 on the staples to obtain the identification 50. The identification 50 can be stored in the database 55. Additional information can be associated with the identification 50 and stored in the database 55. Additional information can include, for example, recipient information, contents of the printed product 165, date and time the printed product 165 was generated, shipping information, postage costs, etc.

After the printed products 165 have been generated in any manner that is known in the art, the resonators 10 can be applied to the printed products 165 and/or to any of the shipping containers for shipment, distribution, and delivery.

Downstream

The resonators 10 can be used by secondary users, such as postal services, distributors, retailers, and consumers. Use of the resonators starting during the print manufacturing process can be beneficial for other downstream users and a life long history of a particular product can be generated.

Retailers of the printed products 165 can request that the resonators 10 be applied for certain purposes. The identifications 50 for each of the printed products 165 destined for a retailer can be shared with the retailer for various purposes. For example, a security alarm can be activated if someone walks through a security gate without paying for the printed product 165. If the printed product 165 has been paid for, the register can deactivate the identification 50 via communication with the database 55 or other suitable computerized system.

Figure 15:
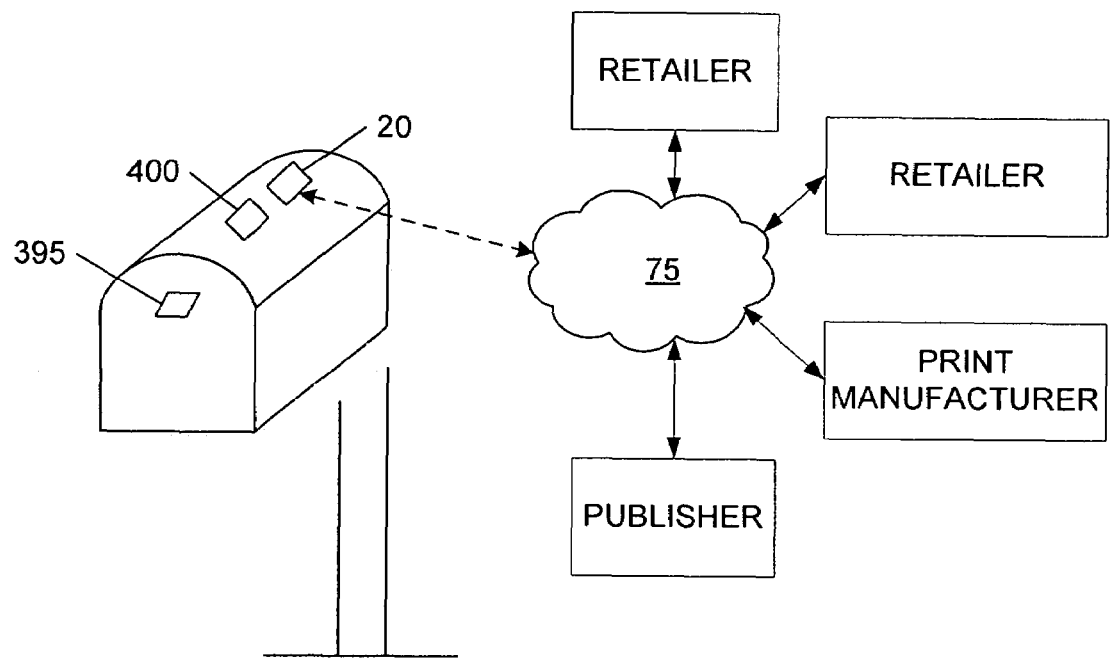
FIG. 15 illustrates a schematic of a method of tracking resonators.

With reference to FIG. 15, the power source 20 can be used in mailboxes 395 and can be linked to a network 75. The power source 20 can include a unique mailbox identifier 400 that identifies the mailbox 395 (and recipient and address). With the resonators 10 embedded in various printed products 165 (e.g., magazines, bills, checks, mail, etc.), a business, a retailer, a publisher, etc. can determine if a particular printed product 165 reached the proper mailbox 395. When the printed product 165 arrives in a mailbox 395, the power source 20 can energize and read the identifications 50 on each printed product 165 in the mailbox 395. The power source 20 can transmit each identification 50 and its mailbox identifier 400 to the network 75, which can be accessed by the various businesses, retailers, publishers, etc. to determine if the printed product 165 arrived in the proper mailbox 395. This can be beneficial when people claim that a check or a bill has not been received.

Various features and advantages of the invention are set forth in the following claims.

What is claimed is:

1. A method for processing a printed product comprising:
providing a first printed product having embedded therein a chipless passive first resonator;
energizing the first resonator with a contactless power source;
reading a first signal emitted from the energized first resonator;
processing the first signal to generate a first unique identifier for the first printed product;
associating the first unique identifier with remotely stored information relating to the first printed product;
providing a second printed product having embedded therein a chipless passive second resonator;
energizing the second resonator with the contactless power source;
reading a second signal emitted from the second resonator;
processing the second signal to generate a second unique identifier for the second printed product;
associating the second unique identifier with remotely stored information relating to the second printed product;
using the first unique identifier to access the stored information related to the first printed product;
using the second unique identifier to access the stored information relating to the second printed product;
and forming an assembled product by assembling the first printed product with the second printed product in response to a determination made based on a pre-established relationship between on the stored information relating to the first printed product and the stored information relating to the second printed product.

2. The method of claim 1 and further comprising, after the act of determining, assembling the first printed product with the second printed product.

3. The method of claim 2 wherein the first printed product includes a signature.

4. The method of claim 3 wherein the second printed product includes one of a second signature, a label, a tag, a wrap, an envelope and packaging.

5. The method of claim 2 and further comprising, after the act of assembling:
- energizing at least one of the first resonator and the second resonator;
- reading a corresponding signal emitted from the at least one of the first resonator and the second resonator;
- processing the corresponding signal to identify a corresponding unique identifier for a printed product embedded with the at least one of the first resonator and the second resonator;
- accessing the information associated with the corresponding unique identifier; and
- determining, based on the information, whether the first printed product is correctly assembled with the second printed product.

6. The method of claim 5 and further comprising, after the act of determining, based on the information, whether the first printed product is correctly assembled with the second printed product, disassembling the first printed product from the second printed product.

7. The method of claim 6 and further comprising, after the act of disassembling, assembling at least one of the first printed product and the second printed product with another printed product.

8. The method of claim 5 and further comprising, after the act of determining, based on the information, whether the first printed product is correctly assembled with the second printed product, correctly assembling the first printed product with the second printed product.

\* \* \* \* \*